Dec. 21, 1954  G. A. WATTS  2,697,508
APRON-TYPE FEEDER
Filed April 25, 1950                         2 Sheets-Sheet 1
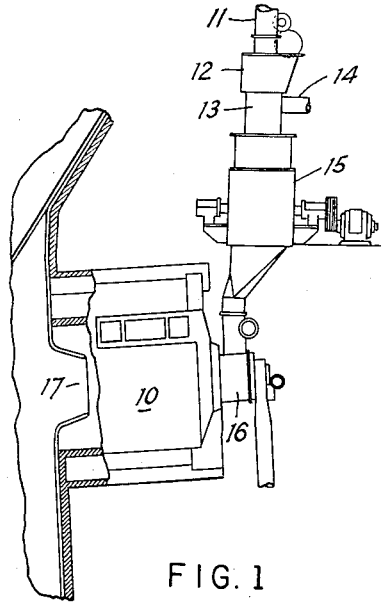
FIG. 1
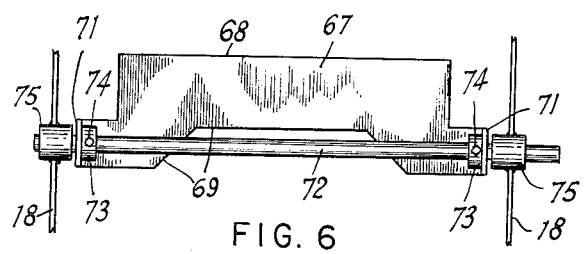
FIG. 6
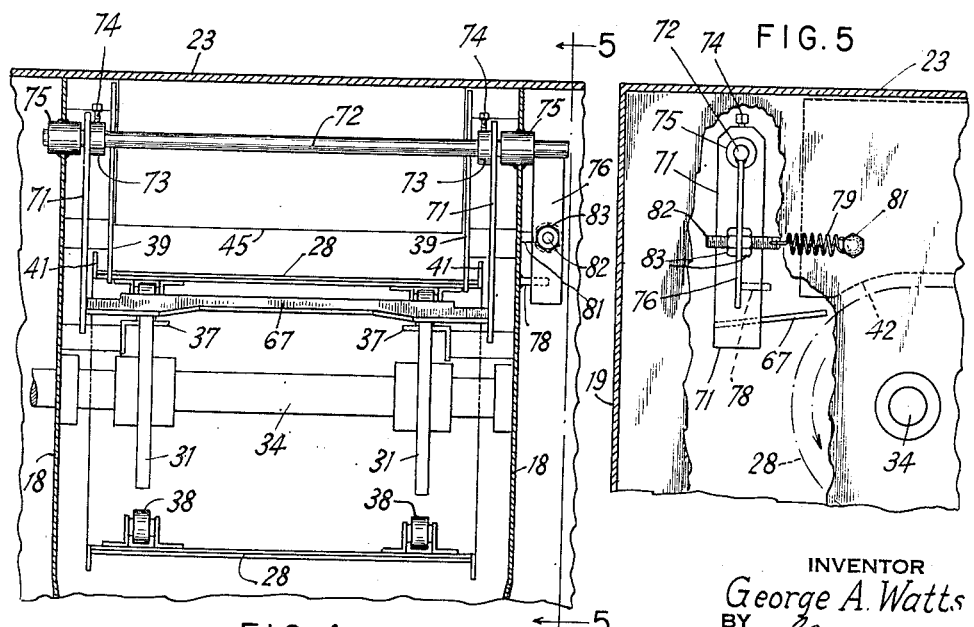
FIG. 5
FIG. 4
INVENTOR
George A. Watts
BY
ATTORNEY Dec. 21, 1954

G. A. WATTS 2,697,508

APRON-TYPE FEEDER

Filed April 25, 1950

INVENTOR
George A. Watts
BY
*J. P. Moran*
ATTORNEY

United States Patent Office 2,697,508
Patented Dec. 21, 1954

2,697,508

APRON-TYPE FEEDER

George A. Watts, Westfield, N. J., assignor to The Babcock & Wilcox Company, Rockleigh, N. J., a corporation of New Jersey Application April 25, 1950, Serial No. 157,859

4 Claims. (Cl. 198—65)

The present invention relates to feeder apparatus of the type employing an endless conveyor, and more particularly to the construction and operation of a conveyor type feeder wherein means are provided for effecting substantial uniformity of material discharge therefrom.

An object of the invention is to provide a feeder particularly adapted for use in an atmosphere of high temperature whereby an all-metal chain type feeder is dictated, and the use of a belt feeder of rubber, fiber, or similar material, is definitely precluded. Further, for certain fuel burning units wherein a uniform feed of fuel is essential, various available all-metal feeders are not entirely adequate, although providing a regulable rate of fuel discharge. In accordance with the present invention, it is therefore my purpose to provide an improved construction of apron-type feeder whereby the rate of fuel or material discharge is not merely regulable, but is substantially continuous and uniform throughout the entire period of operation at any predetermined rate.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Of the drawings:

Fig. 1 is an elevational view illustrating a feeder of my invention as a component of apparatus supplying fuel to a cyclone furnace;

Fig. 4 is a vertical section taken along line 4—4 of Fig. 3;

Fig. 5 is a partial side view of the assembly shown in Fig. 4; and

Fig. 6 is a plan view of parts included in Figs. 4 and 5.

Figure 2:
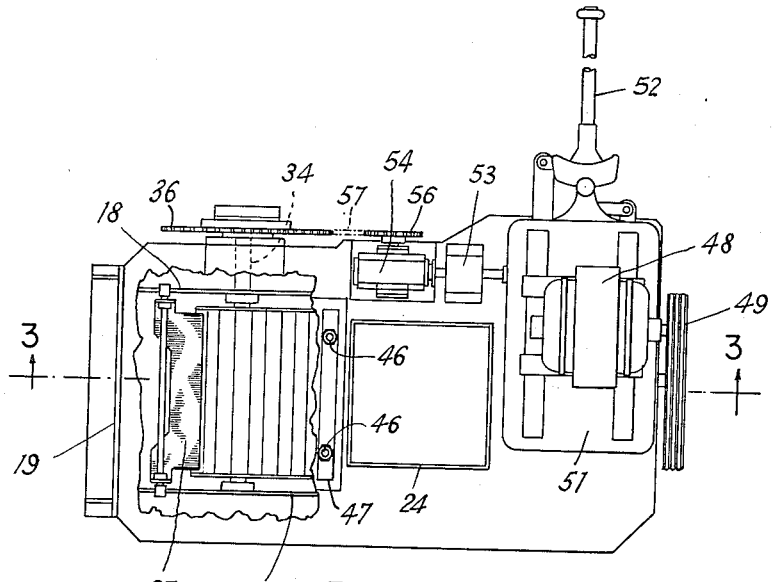
Fig. 2 is a plan view, partly broken away, of the feeder included in Fig. 1.

In more detail, the cyclone furnace 10, as indicated in Fig. 1, of the type shown in U. S. Patent, E. G. Bailey et al., 2,357,301, for example, is preferably fired by a crushed or granular fuel such as bituminous or semi-bituminous coal, the coal being received through a fuel inlet conduit 11, from a suitable source not shown, and delivered through a feeder 12 of a construction to be more fully described. The coal discharging from the feeder passes through a feeder outlet conduit 13 where it is joined by a regulable supply of preheated primary air admitted through conduit 14 under superatmospheric pressure of about thirty-five inches H2O. In the type of installation herein indicated, the temperature of the primary air ranges from about 500 to 700° F. The primary air and coal enter a hammer type coal crusher 15 wherein the coal is reduced to a granular condition and the stream of primary air and granular coal discharged at a relatively high positive pressure to the primary section 16 of the cyclone furnace. Additional air is separately admitted to the furnace in a tangential direction and the resulting hot products of combustion are discharged through a central throat passage 17.

In order to maintain a high degree of uniformity in the flow of fuel to the cyclone furnace 10, it becomes important to maintain a close control on the rate at which raw coal is fed to the crusher 15. This purpose is served by the improved construction of apron-type feeder 12 herein described.

Figure 3:
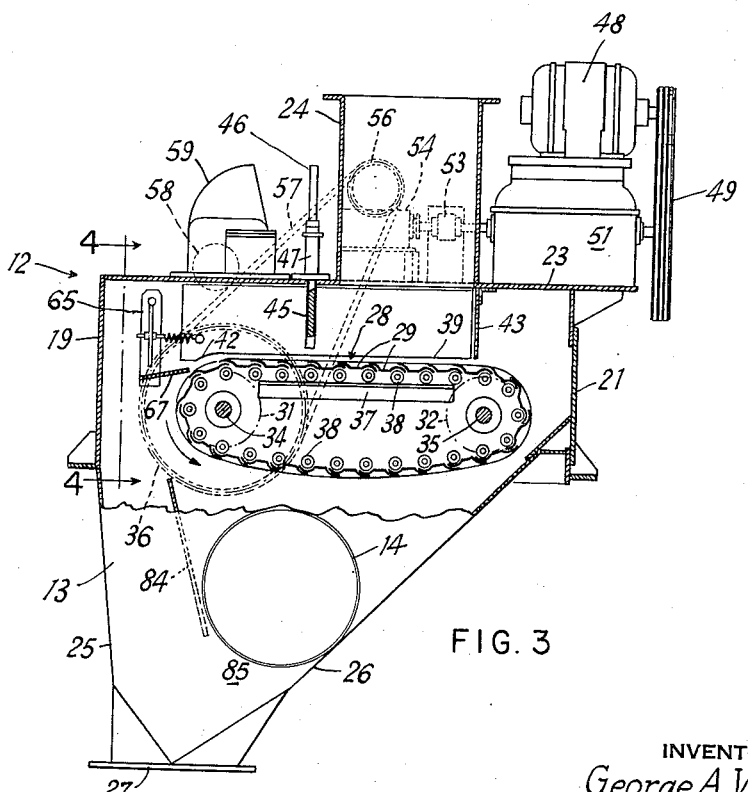
Fig. 3 is an elevational view, partly in section along line 3—3 of Fig. 2.

As illustrated in Figs. 2 to 6, the feeder 12 includes an outer housing having side walls 18, front and rear end walls 19 and 21, and a top wall 23 fitted with a fuel inlet pipe 24. The lower portion of the housing constitutes the feeder outlet conduit or discharge chute 13 having converging front and rear walls 25 and 26 terminating in a bottom fuel outlet 27. The feeder mechanism comprises an endless conveyor belt or chain 28, of a known apron type, having its material supporting surface formed of overlapping metal leaves or pans 29 which are carried by successive links of a double strand rolling chain. As seen in section, the pans 29 are formed with curved overlapping front and rear marginal portions as generally indicated in Fig. 3. The strands of the chain engage front and rear sprockets 31 and 32 arranged in horizontally spaced pairs between side walls 18, 18 and mounted on front and rear shafts 34 and 35 respectively; the front shaft 34 serving as the drive shaft and extending to the exterior of the housing to receive a drive sprocket 36 as indicated in Fig. 2. The top run of the conveyor chain, intermediate the front and rear conveyor sprockets 31 and 32, is supported on side rails 37, through rollers 38 which are incorporated in the chain assembly, the rails 37 being secured to the side walls of the housing. The nominal width of each pan 29 is suitably about four inches measured longitudinally of the conveyor between the centers of successive rollers 38.

Material delivered to the conveyor 28 is confined within the width of the conveyor pans 29 by stationary side skirts 39 which extend vertically downward from the top housing wall 23 to a position superjacent the top run of the conveyor where the skirts overlap walls 41 at the sides of the pans. The lower edge of each side skirt is maintained parallel to the top run of the conveyor and is thus curved downwardly toward the forward end as indicated at 42. A back skirt 43 extends transversely between side skirts 39 and downwardly from the rear margin of the inlet pipe 24 to prevent incoming material from spreading toward the rear of the conveyor. During operation, therefore, all material delivered to the conveyor is carried forwardly by the pans 29 and discharged from the front end adjacent wall 19. A vertically adjustable gate 45 serves to regulate the depth of material being conveyed. Adjustment of the gate position is effected by screws 46 which extend upwardly through the gate housing 47.

The conveyor 28 is driven from an electric motor 48, for example, through various known pieces of power transmission equipment whereby regulable conveyor speeds may be attained, to a maximum of about 9.25 feet per minute. Thus, the motor 48 is connected by belt 49 to a variable speed control device 51, having a control lever 52, and thence through an enclosed coupling 53 to a speed reducer 54 having a sprocket 56 which is connected by a chain 57 to the drive sprocket 36 on the conveyor drive shaft 34, as previously identified. Adjustment of chain 57 is maintained by an idler 58 on idler arm 59.

If the feeder were to be operated in the form thus far described, as each leaf or pan 29 moved forwardly in an arc around the shaft 34, the contents of the pan would be discharged directly into the discharge chute 13 from the front end of the conveyor 28. The discharge from the pan would be of the nature of a small avalanche of coal and this action would be repeated as the contents of successive pans were dumped. As a result of the periodic repetition of this action, the flow of coal to the crusher, and thence to the cyclone furnace 10, would be sufficiently irregular to adversely affect performance throughout the unit.

Therefore, in accordance with the present invention, a discharge equalizing device 65 is installed adjacent the front end of conveyor 28 so as to maintain a substantially uniform rate of coal delivery to the cyclone furnace 10. As herein illustrated, the flow equalizer 65 comprises a flat skimmer or spill plate 67 which extends horizontally throughout and beyond the width of conveyor 28 and which is positioned forwardly adjacent the conveyor at a downward inclination of about 5° therefrom. The rearward or upstream edge portion 68 is straight and of a width slightly less than the distance between opposite side skirts 39, whereas the forward or discharge edge portion 69 is cut back symmetrically at an oblique angle, as indicated, so as to maintain a substantially uniform distribution of discharging material throughout the central major width portion of the plate.

The plate 67 is secured at opposite ends to upright hanger bars 71 which are suspended from an upper horizontal shaft 72, and secured thereto by means of collars 73 and set screws 74; the shaft 72 is mounted for pivotal movement in bearings 75 which are secured in holes in the housing side walls 18. Exteriorly of the housing, a flat bar 76 is secured at its upper end to an extension of shaft 72, while its lower end portion is resiliently maintained in contact with a stop bar 78 secured to the outside of the adjacent housing side wall 18. For this purpose, a spring 79 is provided, having one end fixed to the outer side wall 18 by means of a bolt 81, and its opposite end adjustably secured to the bar 76 by means of a take-up bolt 82 and associated nuts 83. In normal operation, with bar 76 in contact with stop 78, the skimmer plate 67 occupies a position where its straight rearward edge 68 is spaced about one-half inch from the outer peripheral path of the conveyor pans 29 in travelling around the forward sprockets 31.

During operation of the feeder, the coal delivered through inlet pipe 24 to the conveyor chain 28 is leveled off by the gate 45 to a predetermined depth so that the pans 29 as they approach the discharge end of the conveyor are transporting substantially equal amounts of material. As successive pans move past the flow equalizer 65, the transverse plate 67 acts to intercept and skim off the greater portion of the coal from the respective pans, and the coal thus skimmed off continues forwardly along the top side of plate 67 from which it is discharged over the front edge 69 in a continuous stream and at a uniform rate. The downward inclination of plate 67 in the direction of coal discharge therefrom acts to limit and minimize the resistance to the flow of coal thereover. A relatively small remaining proportion of the conveyed coal will pass to the underside of plate 67, directly into the outlet chute 13, but because of the small clearance between the plate and the conveyor, the amount that bypasses the plate is sufficiently small so as to not appreciably detract from the overall uniformity of discharge. The purpose of the spring loading of plate 67 is to effect the automatic release of any relatively large pieces of pyrites or other solid material which might otherwise become jammed between the plate 67 and the conveyor 28.

The total discharge from the conveyor is directed into the discharge chute 13 between the front wall 25 and an interior baffle 84 which converges downwardly toward the rear wall 26 of the chute, the baffle 84 terminating below the location of the air inlet 14 and leaving an air passage 85 through which the primary air flows to join the discharging coal. The air is thus directed downwardly toward the bottom outlet 27 so as to maintain movement of coal in the same direction.

In coal burning units of the type herein described, in which my invention has been used, the beneficial effect of the improved regularity of coal discharge from the feeder has been apparent from furnace observations. Obviously, the invention is equally applicable to various other forms of fuel burning units wherein uniform regulation of solid fuel delivery is essential.

While in accordance with the provisions of the statutes I have illustrated and described herein the best form of my invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. A feeder of the apron type having an endless conveyor element formed of successive overlapping pans and operable in a direction resulting in movement of the top run thereof toward the front end of an enclosing housing, an inlet to said housing for the delivery of material to said conveyor at a point adjacent the back end thereof, and discharge equalizing means positioned forwardly of said top run for intercepting material about to be discharged from said conveyor, said means comprising a skimmer plate extending transversely of the length of said conveyor and inclined forwardly and downwardly from a position adjacent said conveyor and arranged to direct the major portion of the conveyed material over said plate for discharge from the front edge thereof, said skimmer plate having its rearward edge substantially straight and parallel to the top run of the conveyor, and having its front discharge edge cut back symmetrically to provide a minimum width of plate throughout a central portion of its dimension transversely of the length of the conveyor, bars supporting said plate arranged upright at opposite sides of the conveyor interiorly of the housing, a shaft arranged above said plate and pivotally movable with respect to said housing, and means including a bar attached to said shaft exteriorly of said housing for resiliently maintaining a predetermined minimum clearance space between said conveyor and the adjacent edge of said plate.

2. A feeder of the apron type having an endless conveyor element formed of successive overlapping pans and operable in a direction resulting in movement of the top run thereof toward the front end of an enclosing housing, an inlet to said housing for the delivery of granular material to said conveyor at a point adjacent the back end thereof, discharge equalizing means positioned forwardly of said top run for intercepting separate masses of said granular material about to be successively discharged from successive pans of said conveyor, said means comprising a horizontally pivoted skimmer plate extending transversely of the length of said conveyor and inclined forwardly and downwardly from a position adjacent said top run at an elevation subjacent the uppermost margin of pans in said top run, said plate having its upper inclined surface more nearly horizontal than vertical, said plate being arranged to cause the intercepted material to slide over said plate for discharge from the lower front edge thereof, and means for resiliently maintaining a predetermined minimum clearance space between said conveyor and the adjacent upper edge of said plate.

3. A feeder of the apron type having an endless conveyor element formed of successive overlapping pans and operable in a direction resulting in movement of the top run thereof toward the front end of an enclosing housing, an inlet to said housing for the delivery of material to said conveyor at a point adjacent the back end thereof, and discharge equalizing means positioned forwardly of said top run for intercepting material about to be discharged from successive pans of said conveyor, said means comprising a horizontally pivoted skimmer plate extending transversely of the length of said conveyor and inclined forwardly and downwardly from a position adjacent said top run of said conveyor at an elevation below the uppermost margin of pans in said top run and arranged to direct the major portion of the conveyed material over said plate for discharge from the lower front edge thereof, and means for resiliently maintaining a predetermined minimum clearance space between said conveyor and the adjacent upper edge of said plate, the skimmer plate edge adjacent the conveyor being substantially straight and parallel to the top run of the conveyor, and the opposite discharge edge being cut back at an oblique angle symmetrically between opposite ends of the plate to provide a minimum reduced width of plate between said edges throughout a central portion of its dimension transversely of the length of said conveyor.

4. A feeder of the apron type having an endless conveyor element formed of successive overlapping pans and operable in a direction resulting in movement of the top run thereof toward the front of an enclosing housing, an inlet to said housing for the delivery of granular material to said conveyor at a point adjacent the back end thereof, discharge equalizer means positioned forwardly of said top run for intercepting separate masses of said granular material about to be successively discharged from successive pans of said conveyor, said means comprising a horizontally inclined and pivoted plate extending forwardly and downwardly from a position adjacent said top run of said conveyor at an elevation subjacent the uppermost margin of pans in said top run and arranged to cause the intercepted material to slide over said plate for discharge from the lower front edge thereof, said housing having a lower outlet through which all material discharged from said conveyor is directed to a single point of use, said feeder further comprising a support for said plate arranged for pivotal movement about an axis above the elevation of said plate, said support including upright hanger members disposed at opposite sides of said conveyor element and connected to opposite end portions of said plate, stop means rigid with said housing for determining a minimum operating clearance space between said conveyor and the adjacent edge of said plate, means pivotally movable in unison with said plate support, and means resiliently biasing said pivotally movable means into a position of contact with said stop means.

References Cited in the file of this patent

UNITED STATES PATENTS

| Number | Name | Date |
|---|---|---|
| 610,845 | Freitag | Sept. 13, 1898 |
| 781,614 | McCabe | Jan. 31, 1905 |
| 1,299,587 | Parker et al. | Apr. 8, 1919 |
| 1,531,126 | O'Brien | Mar. 24, 1925 |
| 1,804,423 | Krenzke | May 12, 1931 |
| 2,398,821 | Davidson | Apr. 23, 1946 |
| 2,582,583 | Bros | Jan. 15, 1952 |

FOREIGN PATENTS

| Number | Country | Date |
|---|---|---|
| 527,292 | Germany | June 16, 1931 |